Jan. 3, 1967    S. P. WOODS    3,295,548
IRRIGATION SYSTEM
Filed April 21, 1964    2 Sheets-Sheet 1
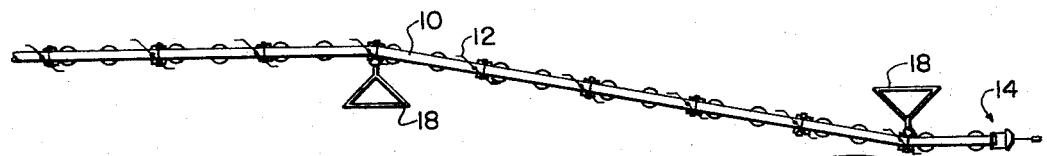
FIG. 1
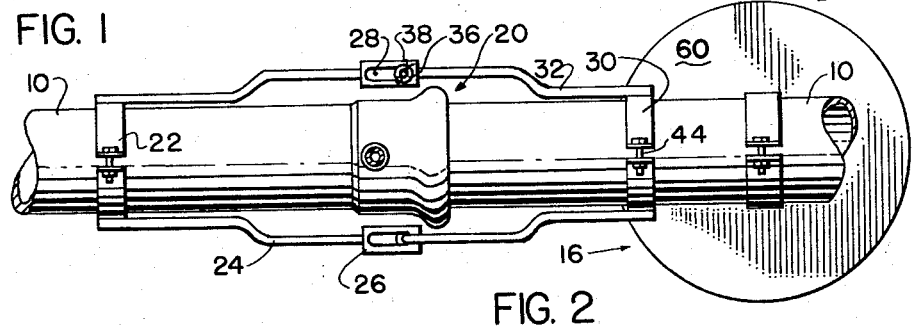
FIG. 2
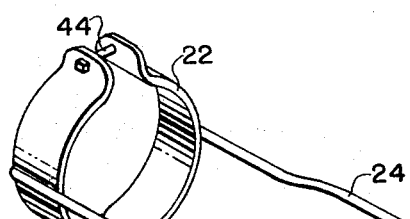
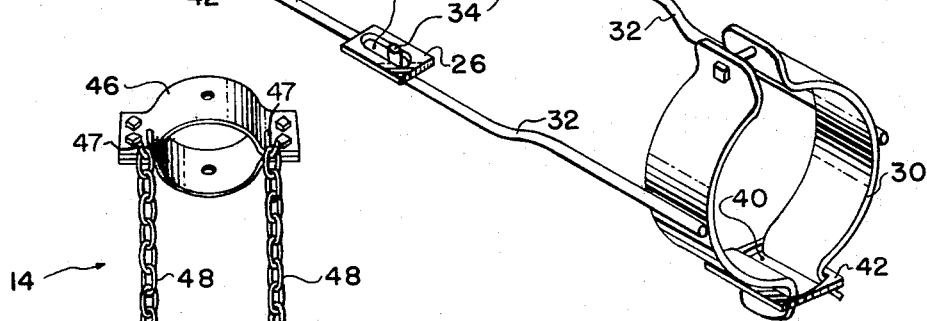
FIG. 3
FIG. 4
SYLVESTER P. WOODS
INVENTOR.
BY: *C. W. McAfee*
Atty.

Jan. 3, 1967  S. P. WOODS  3,295,548
IRRIGATION SYSTEM
Filed April 21, 1964  2 Sheets-Sheet 2
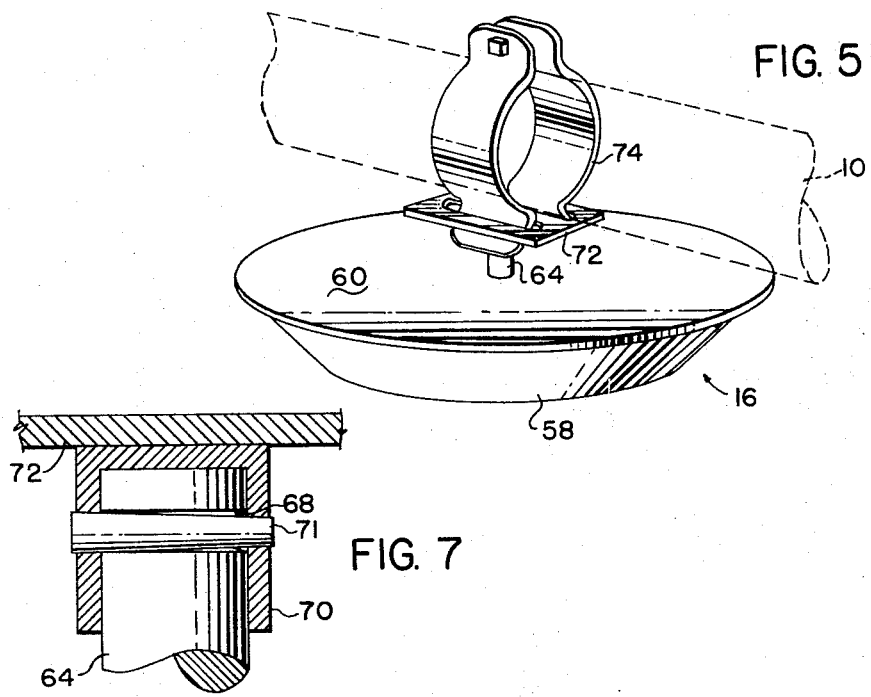
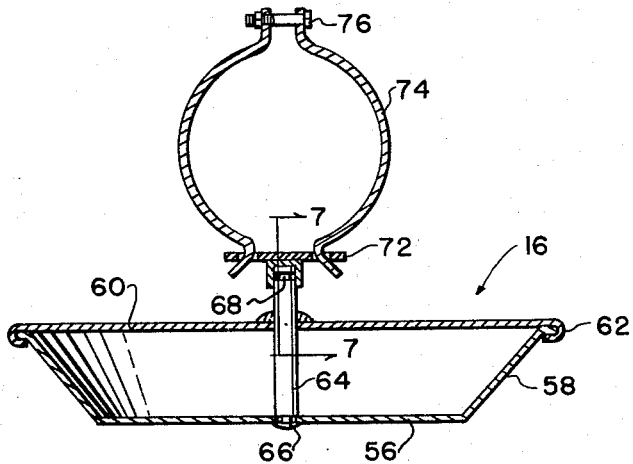
SYLVESTER P. WOODS
INVENTOR.
BY: *C. W. Coffee*
Atty.

United States Patent Office 3,295,548
Patented Jan. 3, 1967

3,295,548
IRRIGATION SYSTEM
Sylvester P. Woods, 2109 62nd St.,
Lubbock, Tex. 79412
Filed Apr. 21, 1964, Ser. No. 361,497
9 Claims. (Cl. 137—344)

This invention relates to agricultural irrigation systems and more particularly to the tow type system.

By tow type system, I mean those types of irrigation systems which are towed by a tractor axially of the system through the field. Examples of this type system are shown in the United States patents to Johnson, 2,834,634, and Moulton, 2,912,996.

In these systems if the angular displacement of the joint is too great, the coupling by which the individual pipe elements are connected together may be damaged. Therefore, I have invented a device which limits the amount of deflection at each joint to prevent damage to the coupling.

In addition, the type of skid carrying the pipe has given trouble in the past. To improve upon such a system at an inexpensive cost I have invented a skid which consists primarily of a flat pan-like structure which operates flat against the ground. It is free to rotate so that normally it will be rotating either in one direction or the other rather than straight skidding as a sled. However, it does have sufficient skidding action to keep it free of mud accumulation thereon.

Furthermore, connecting the towing vehicle to the system has given difficulty in the past. Due to the weight of the system it is impossible to move it slightly forward or back by hand to attach the hitch to the towing vehicle. I have invented a flexible chain hitch which may be connected to the towing vehicle and hooked to a clamp which is attached to one end of the system.

An object of this invention is to provide means for limiting angular deflection in the couplings and to prevent damage to the pipe of a tow type irrigation pipe moving system, and for connecting the pipe elements.

Another object of this invention is to provide an improved support for skidding or moving the pipe.

A further object of this invention is to provide a skid which will reduce the friction and the power required to tow the pipe, which will not accumulate mud, and which will keep the pipe upright.

A further object of this invention is to provide a hitch that simplifies the task of attaching the towing vehicle to the system.

Still further objects are to achieve the above with a device that is sturdy, compact, durable, simple, versatile, and reliable, yet inexpensive and easy to manufacture and operate.

The specific nature of the invention as well as other objects, uses, and advantages thereof will clearly appear from the following description and from the accompanying drawing, the different views of which are not necessarily to the same scale, in which:

FIG. 1 is a plan view of a portion of a system embodying this invention.

FIG. 2 is an enlarged partial plan view of one joint illustrating the angle deflection limiting device and the pan skid.

FIG. 3 is a perspective view of the means for limiting the angular deflection of each coupling shown removed from the pipe system.

FIG. 4 is a perspective view of the hitch for attaching the pipe system to a towing vehicle, detached from the system.

FIG. 5 is a perspective view of a skid according to this invention with the pipe shown in dashed lines.

FIG. 6 is an axial sectional view of the skid shown in FIG. 5.

FIG. 7 is a sectional detailed view taken on line 7—7 of FIG. 6.

Particularly referring to FIG. 1, the invention is particularly adapted for moving an irrigation pipe line which is constructed of a plurality of pipe elements 10. These pipe elements 10 carry sprinklers 12 thereon to sprinkle the water upon the land to be irrigated. To move this particular type system a tractor (not shown) is attached to the line by hitch 14 and the line is towed axially to its new location, the line skidding along on skid assemblies 16. The pipe is guided as it is skidded along by guides 18 which are anchored into the earth. Such anchors are well known to the art and commercially available upon the market. Somewhat similar anchors are shown in the United States patent to Fischer, 2,990,121, and therefore, will not be further discussed at this point except to note that the pipe line has an angular deflection at each flexible joint 20 as it is towed past the guide 18.

A means for limiting this angular deflection at each of the flexible joints 20 between two pipe elements 10 is provided.

Describing more particularly the means for limiting the angular displacement at the joint (FIGS. 2 and 3) there is a band 22 which is securely fastened to one of the pipe elements 10 adjacent to one of the joints 20. On either side of this band there is a rod 24 welded or otherwise bonded to the band 22. Slotted plate 26 is attached to the end of each rod 24. The plates 26 have an elongated slot 28 therein which is aligned parallel to the pipe 10. A second band 30 is attached to another one of the pipe elements 10 adjacent to the joint 20. Likewise it has two rods 32 welded or otherwise bonded to either side thereof. The rods 32 terminate with a hook portion 34. Each hook 34 extends through a slot 28 in the slotted plate 26. Washer 36 is held onto the end of the hook 34 by a cotter key 38 to hold the hook 34 engaged with the slotted plate 26. The bands 22 and 30 are made by providing two curved straps, the bottom portion of which extends through slot 40 in the slotted buckle 42 at the bottom of the band. The two straps have ears at the top through which extends bolt 44 to clamp the bands securely upon the pipe element 10.

The bands 22 and 30 are attached to the pipe elements 10 so that if the two pipe elements 10 are aligned at the joint 20 that each of the hooks 34 will be at the end of the slot 28. Therefore, the stress is transmitted through rods 24 and 32 and not through joint 20. However, if the pipe line is being towed around the guides 18, the maximum deflection permissible is limited by the hooks 34 striking the ends of the slots 28 in the slotted plate 26. Thus it may be seen that the limit of anglar deflection is limited by the length of the slots 28 and not by the coupling of the joint 20. Therefore, the coupling is protected from damage because of sharp angular deflection at the joint 20.

As may be seen more clearly in FIG. 3, one of the hooks 34 extends downward while the other hook 34 extends upward. Therefore, the hooks may be engaged in the slots 28 by pushing the coupling at the joint 20 together and then rotating one of the pipe elements 10 in relationship to the other.

As may be seen in FIG. 4 of the hitch 14 includes a clamp 46 tightly attached about one end of the pipe line. Two hooks 47 are welded or otherwise bonded to the clamp 46. Two chains 48 engage the hooks 47. The chains 48 are attached to the equalizer plate 50. A third chain 52 attaches the equalizer plate 50 to the clevis 54 which is in turn attached to the drawbar of a tractor (not shown). Thus is provided means attached to one end of a series of pipe for towing the series of pipe axially thereof.

The clamp 46 may be attached to one end of the system and left there. The tractor with the clevis 54 attached thereto is backed up to the end of the system close enough to engage the chains 48 with the hooks 47. After the tractor is in this position, the single operator may discount from the tractor and engage the chains 48 with the hooks 47. Thereafter he again mounts the tractor and can take up the slack in the chains 52 and 48 and commence towing the system. If a rigid hitch were used it would not be possible for one man so simply to engage the towing vehicle with the system. It is only possible to use a flexible hitch 14 because of the stability the skid assembly 16 givs to the system. I.e. if the system has a tendency to turn over onto its side, a flexible hitch 14 would not prevent this and therefore, the system would turn over as it was being towed around the guides 18. However, with my system and the stability it has, it is possible to use the flexible hitch 14.

Considering the skid assmbly 16 in more detail (FIGS. 5, 6, and 7) the skid assembly includes a hollow container in the shape of a pan. This includes a flat bottom 56 with walls 58 that slope outward and upward. The sides as made of the walls 58 are part of frustrum of a cone which would have its apex downward. Flat top 60 is crimped at the edges 62 over the sides 58. Pintle 64 extends along the axis of the pan. Its bottom portion has a reduced pin area which extends through a hole in the bottom 56 and the end of the pin is riveted down at 66 to form a water tight seal. Where the pintle 64 extends through the top 60 it is welded forming a secure joint. The pintle has annular groove 68 near the top thereof.

The top of the pintle 64 is telescoped within cup 70. Tapered pin 71 extends through eccentric holes in the cup 70 so that the pin 71 fits within the groove 68 thus rotatably securing the pintle 64 and pan to the cup 70. When the pipe is resting upon the skid assembly 16, the weight of the pipe will hold the cup 70 downward over the pintle 64. However, if the skid assembly 16 passes over irregular ground and there is no supporting ground under the skid assembly, the tapered pin 71 rotatably holds the skid assembly to the pipe. The cup 70 is welded or otherwise bonded to slotted buckle 72. Two arcuate straps 74 extending through slots in the buckle 72 form a band. Bolt 76 extends through ears at the top of the straps 74. Thus the skid assembly 16 is securely attached to the pipe element 10.

The angle formed between the sides 58 and the bottom 56 is not a sharp angle. Therefore, if the skid assembly 16 moves against growing crops it does not present a sharp edge which tends to shear the crop. Also, as the pan presents one edge to the side of a furrow, the pan will roll about the axis. On almost any ground the ground will be uneven so that there is more stress against one side of the bottom 56 than the other. Therefore, ordinarily the pan will roll as it moves along the field. There will be some skidding action which is deemed desirable to scour the dirt from the pan bottom. Thus, the skid assembly 16 which I have invented pulls much easier because it has primarily a rolling or rotating action rather than a skidding action. However, it does skid sufficiently to prevent a buildup of dirt along the bottom.

It will be apparent that the embodiment shown is only exemplary and that various modifications can be made in construction, materials, and arrangement within the scope of the invention as defined in the appended claims.

I claim as my invention:

1. In an agricultural irrigation pipe line system having
   (a) a series of pipe elements
   (b) axially connected by flexible joints,
   (c) each pipe element adapted to carry means for sprinkling water therefrom, and
   (d) a hitch means attached to one end of the series for towing the series axially;
   each pipe element having attached thereto at least one improved skid assembly comprising:
   (e) a pan with
   (f) a circular cross-section and a flat bottom, and
   (g) means for attaching the pan to the pipe element for rotation of the pan about its axis which is upright.

2. The invention as defined in claim 1 wherein said hitch means includes:
   (h) a clamp attached to one end of the series,
   (j) two hooks on the clamp,
   (k) two chains, one of said chains engaged with each hook,
   (m) a plate attached to the chains,
   (n) a third chain attached to the plates, and
   (o) a clevis attached to the third chain.

3. In an agricultural irrigation pipe line system having
   (a) a series of pipe elements
   (b) axially connected by flexible joints,
   (c) each pipe element adapted to carry means for sprinkling water therefrom, and
   (d) a hitch means attached to one end of the series for towing the series axially;
   each pipe element having attached thereto at least one improved skid assembly comprising:
   (e) a pan with
   (f) a circular cross-section and a flat bottom,
   (g) means for attaching the pan to the pipe element for rotation of the pan about its axis which is upright, and
   (h) also improved means for limiting annular deflection of each of the flexible joints between pipe elements including,
   (i) a band attached to one of the pipe elements adjacent one of the joints,
   (j) two arms bonded to the band and extending on either side of said joints,
   (k) a slotted plate at the end of each of the arms,
   (m) a second band attached to one of the pipe elements adjacent said joint,
   (n) two additional arms bonded to the second band and extending on either side of said joint, and
   (o) a hook on the end of each of the second arms,
   (p) each of said hooks extending through one of the slotted plates.

4. In an agricultural irrigation pipe line system having
   (a) a series of pipe elements
   (b) axially connected by flexible joints,
   (c) each pipe element adapted to carry means for sprinkling water therefrom, and
   (d) a hitch means attached to one end of the series for towing the series axially;
   each pipe element having attached thereto at least one improved skid assembly comprising:
   (e) a pan having
   (f) a flat circular bottom with
   (g) sides sloping upward and outward so that the sides form the frustum of a cone with the apex down,
   (h) a circular cover over the top of the pan,
   (j) a pintle at the axis of the pan which is vertical,
   (k) said pintle attached to the bottom and top of the pan and
   (m) extending upward from the top,
   (n) a cup telescoped over the top of the pintle,
   (o) a slotted horizontal buckle plate bonded to the cup, and
   (p) a band with parts thereof extending through slots in the buckle plate,
   (r) said band surrounding the pipe element thus attaching the skid assembly to the pipe element.

5. In an agricultural irrigation pipe line system having
   (a) a series of pipe elements
   (b) axially connected by flexible joints, (c) a hitch means attached to one end of the series for towing the series axially, and
(d) at least one guide anchored in the ground contacting the pipe for guiding it as it is towed,
(e) each pipe element adapted to carry means for sprinkling water therefrom, the improved means for limiting the angular deflection of each joint between pipe elements comprising:
(f) a band attached to one of the pipe elements adjacent one of the joints,
(g) two arms bonded to the band and extending to either side said joint,
(h) a second band attached to another one of the pipe elements adjacent said joint, and
(j) two additional arms bonded to the second band and extending to either side of said joint where each additional arm is attached to one of said first mentioned arms,
(k) said attachment of said arms including a slotted plate with slots therein attached to one of the arms and a hook in the slot on the other arm.

6. The invention as defined in claim 5 with the addition of at least one improved skid assembly attached to each of said pipe elements comprising:
(m) a pan with
(n) a circular cross section and a flat bottom, and
(o) means for attaching the pan to the pipe element for rotation of the pan about its axis which is upright.

7. The invention as defined in claim 5 wherein said hitch means includes:
(m) a clamp attached to one end of the series,
(n) two hooks on the clamp,
(o) two chains, one of said chains engaged with each hook,
(p) a plate attached to the chains,
(q) a third chain attached to the plate, and
(r) a clevis attached to the third chain.

8. In an agricultural irrigation pipe line system having
(a) a series of pipe elements
(b) axially connected by flexible joints,
(c) a hitch means attached to one end of the series for towing the series axially, and
(d) at least one guide anchored in the ground contacting the pipe for guiding it as it is towed,
(e) each pipe element adapted to carry means for sprinkling water therefrom;

the improved means for limiting the angular deflection of each joint between pipe elements comprising:
(f) a band attached to one of the pipe elements adjacent one of the joints,
(g) two arms bonded to the band and extending to either side said joint
(h) a slotted plate at the end of each of the arms,
(j) a second band attached to one of the pipe elements adjacent said joint,
(k) two additional arms bonded to the second band and extending to either side of said joint, and
(m) a hook on the end of each of the second arms,
(n) each of said hooks extending through one of the slotted plates.

9. The invention as defined in claim 8 with the addition of at least one improved skid assembly attached to each pipe element comprising:
(o) a pan having,
(p) a flat circular bottom with
(q) side sloping upward and outward so that the sides form the frustum of a cone with the apex down,
(r) a circular cover over the top of the pan,
(s) a pintle at the axis of the pan which is vertical,
(t) said pintle attached to the bottom and top of the pan, and
(u) extending upward from the top,
(v) a cup telescoped over the top of the pintle,
(w) a slotted horizontal buckle plate bonded to the cup,
(x) a band with parts thereof extending through slots in the buckle plate,
(y) said band surrounding the pipe element thus attaching the skid assembly to the pipe element.

References Cited by the Examiner

UNITED STATES PATENTS

| | | | |
|---|---|---|---|
| 2,067,428 | 1/1937 | Wallis | 285—6 X |
| 2,281,633 | 5/1942 | Stitzer | 285—5 |
| 2,469,538 | 5/1949 | Young | 285—5 |
| 2,652,282 | 9/1953 | Willetts | 239—213 X |
| 2,741,509 | 4/1956 | Melcher | 137—344 |
| 2,795,459 | 6/1957 | Cornelius | 137—343 X |
| 2,796,292 | 6/1957 | Maggart | 239—213 |
| 2,834,634 | 5/1958 | Johnson | 239—213 X |
| 2,879,787 | 3/1959 | Ingram | 137—344 |
| 3,057,559 | 10/1962 | Ingram et al. | 239—213 |
| 3,114,392 | 12/1963 | Harper | 137—343 X |

M. CARY NELSON, *Primary Examiner.*

S. SCOTT, *Assistant Examiner.*